Nov. 7, 1967          A. BENJAMIN          3,350,731
                       TAPPING DEVICE
Filed April 15, 1965                      3 Sheets-Sheet 1

INVENTOR.
ALLEN BENJAMIN
BY
Wm. H. Dean

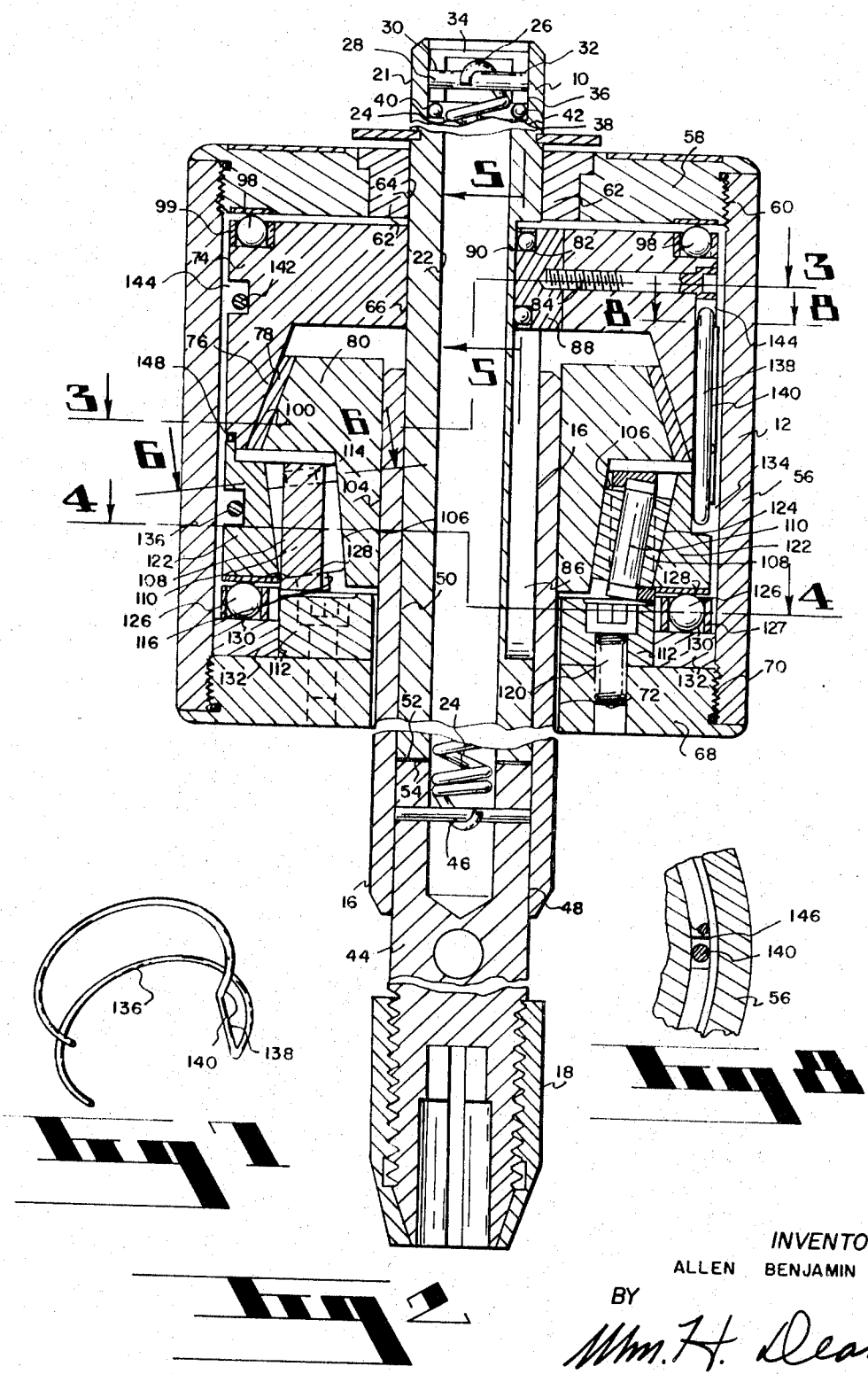

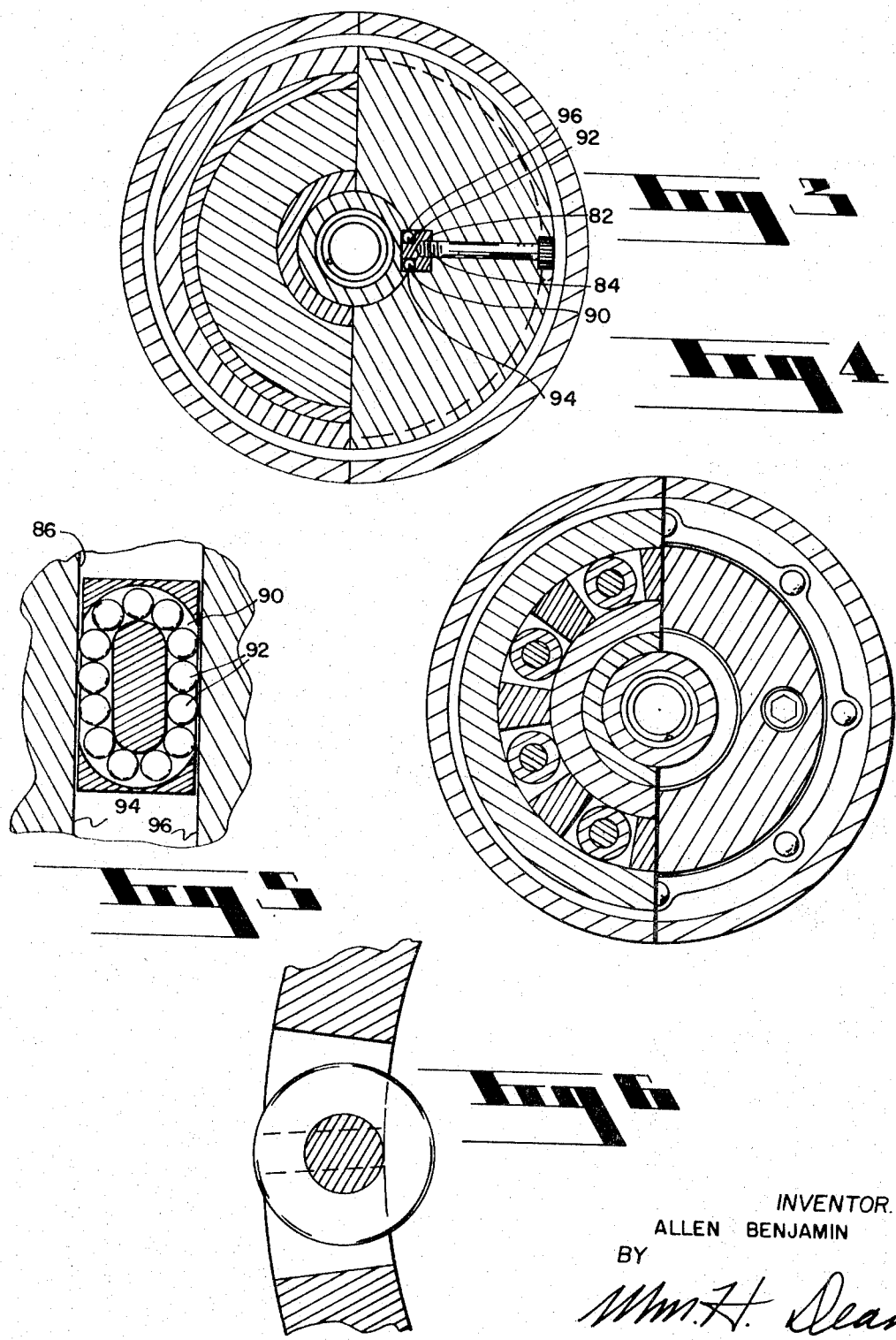

United States Patent Office 3,350,731
Patented Nov. 7, 1967

3,350,731
TAPPING DEVICE
Allen Benjamin, 3018 N. 53rd Place,
Phoenix, Ariz. 85018
Filed Apr. 15, 1965, Ser. No. 448,526
7 Claims. (Cl. 10—136)

ABSTRACT OF THE DISCLOSURE

A tap driving device adapted to be carried by and driven in connection with the chuck of a drill press; the tapping device having a telescopically upwardly and downwardly movable body adapted, when moved downwardly, to drive a tap in one direction for tapping a hole, and the body when moved telescopically upward, adapted to reverse the direction of the driven tap for retracting it from the hole; the tapping device comprising tapered clutch means operable in opposite directions for the tapping and retracting operations.

---

This invention relates to a tapping device, and more particularly, to a tapping device of the power driven manually controlled type for use in cutting screw threads internally of holes in various structures.

Various prior art tapping devices are operable in connection with power driven chucks of drill presses or in connection with various machine tools and most of such prior art tapping devices employ considerable leverage in the actuation of the tapping device, such that a tap operated by the device is unable to seek a conforming axial position in a rough tapped hole for the purpose of progressive tapping.

It has been recognized that many tapped holes, particularly those machined in very hard materials, may require retapping to finish the threads in the hole to the desired tolerances. Accordingly, a lack of the ability to do this in prior art machines has imposed considerable hand labor in the production of various tapped holes, principally in retapping such holes to finish them.

Many prior art tapping devices, due to their leverage and due to the fact that the operator's sense of feel is remote from the operation of the tap, may be operated with a dull tap without any indication of such a condition to the operator. Tapping holes with a dull tap, thus, results in internally screw threaded holes which are improperly finished and which may not receive complemental externally screw threaded parts. Such poorly finished holes, when produced on the high production basis, either cause rejection of the tapped part, or must be finished tapped by hand labor due to the fact that the usual drill press lever operated tapping device may not automatically permit a tap to seek conformity with the initially rought cut threads of a tapped hole. Ordinarily, any attempt to use a drill press operated tapping device of the prior art results in an axial mismatch of the cutting threads of the tap with the previously rough tapped threads in such a manner that the originally rough tapped threads are completely or partially cut away and thereby destroying the previously rough tapped threads.

Various prior art tapping devices have some disadvantages in the requirements for special holding fixtures and attendant set-up time, otherwise, a complete drill press or other machine must be solely devoted to tapping operations in order to avoid the expenditure of such set-up time to ready a drill press for production tapping operations.

Accordingly, it is an object of the present invention to provide a tapping device having a shaft which may be secured directly in a conventional drill press chuck in place of conventional drills; said tapping device requiring no further fixtures, and thus, requiring a minimum of set-up time, such as that comparable to the fixing of a drill in a conventional drill press chuck.

Another object of the invention is to provide a tapping device carried by a power driven chuck of a machine tool and which is telescopically extendable beyond its normal power driven position; said tapping device being provided with a manually engageable structure for telescopically extending a tap carried thereby, such that manually applied axial pressure related to torque reaction from the tap may be felt by the fingers of the operator while the tap is projected into a hole, in which threads are being cut, so that the required amount of pressure may be very readily sensed for efficiently and smoothly tapping a hole.

Another object of the invention is to provide for a power driven manually actuated tapping device, which due to manual axial projection of a tap in a hole and the feel of axial pressure as it relates to reaction from the tap as it progresses into the hole, permits the entrance of a tap in a previously tapped hole, such that the cutting threads of the tap seek a conforming meshed relation with the previously tapped threads without destroying or damaging such previously cut threads in any way and, thus, permitting cleaning of previously cut threads, or the preliminary machining of undersized threads in very hard parts and then subsequently picking up the thread and finishing it with a finishing tap.

Another object of the present invention is to provide a very compact self-contained tapping device which is carried by the driven chuck of a drill press or other machine tool and wherein telescopically extendable mechanism permits the tap carried by the tapping device to be projected into a hole by manual touch, not only to sense the axial loading of the tap in the hole, but also to sense axial pressure as it relates to torque reaction of the tap so that the operator may detect unusual conditions of hardness in a piece of material or may detect a dulled condition of the tap so that the operator is fully aware of any resistance to the tapping operation which would indicate imperfect thread machining operations or any unusual overload condition whereby precision tapping may readily be accomplished with a minimum of difficulty and/or improperly tapped holes.

Another object of the invention is to provide a tapping device having a telescopic shaft assembly which at one end may be secured and held in a driving chuck of a machine tool and wherein telescopic mechanism permits a tap carried by the device to be projected longitudinally of its axis into a hole for cutting threads therein and wherein means in the tapping device of the invention permits an operator to apply manual force in an opposite direction to the said telescopic extension of the tap into the hole which automatically causes a rotational reversal of the tap so that it may readily be backed out of the hole when the thread has been cut therein.

Another object of the invention is to provide a tapping device which is power driven yet manually controlled, such that manual sensitivity to axial projection of the tap into a hole and related torque reaction of the tap as it works in the hole provides for and permits precision tapping of blind holes without tap breakage or destruction of the parts being tapped.

Another object of the invention is to provide a tapping device which is provided with a shaft adapted to be power driven by the chuck of a power tool and which is also provided with telescopic means for manual extension of the tap into the hole axially thereof and which means also transmits torque reaction of the working tap to the fingers of the operator; said tapping device also having a friction clutch element manually operable to drive the tap whereby unusual loading of the tap either in a blind hole or due to some other factor may require equivalent manual loading of the clutch to drive the tap or may permit instant manual release of the clutch and/or slippage thereof to prevent tap breakage or part damage.

Another object of the invention is to provide a tapping device which is very compact, very precise and durable.

Further objects and advantages of the invention may be apparent from the following specification, appended claims and accompanying drawings, in which:

FIG. 2 is an enlarged fragmentary axial sectional view of the tapping device, shown taken on line 2—2 of FIG. 1 of the drawings, and illustrating parts and portions internally of the device in elevation;

FIG. 3 is a reduced sectional view taken from the line 3—3 of FIG. 2;

FIG. 4 is a reduced sectional view taken from the line 4—4 of FIG. 2;

FIG. 5 is an enlarged fragmentary sectional view taken from the line 5—5 of FIG. 2;

FIG. 6 is an enlarged fragmentary sectional view taken from the line 6—6 of FIG. 2;

FIG. 7 is a perspective view of an assembly retainer spring of the invention; and FIG. 8 is a fragmentary sectional view taken from the line 8—8 of FIG. 2.

Figure 1:
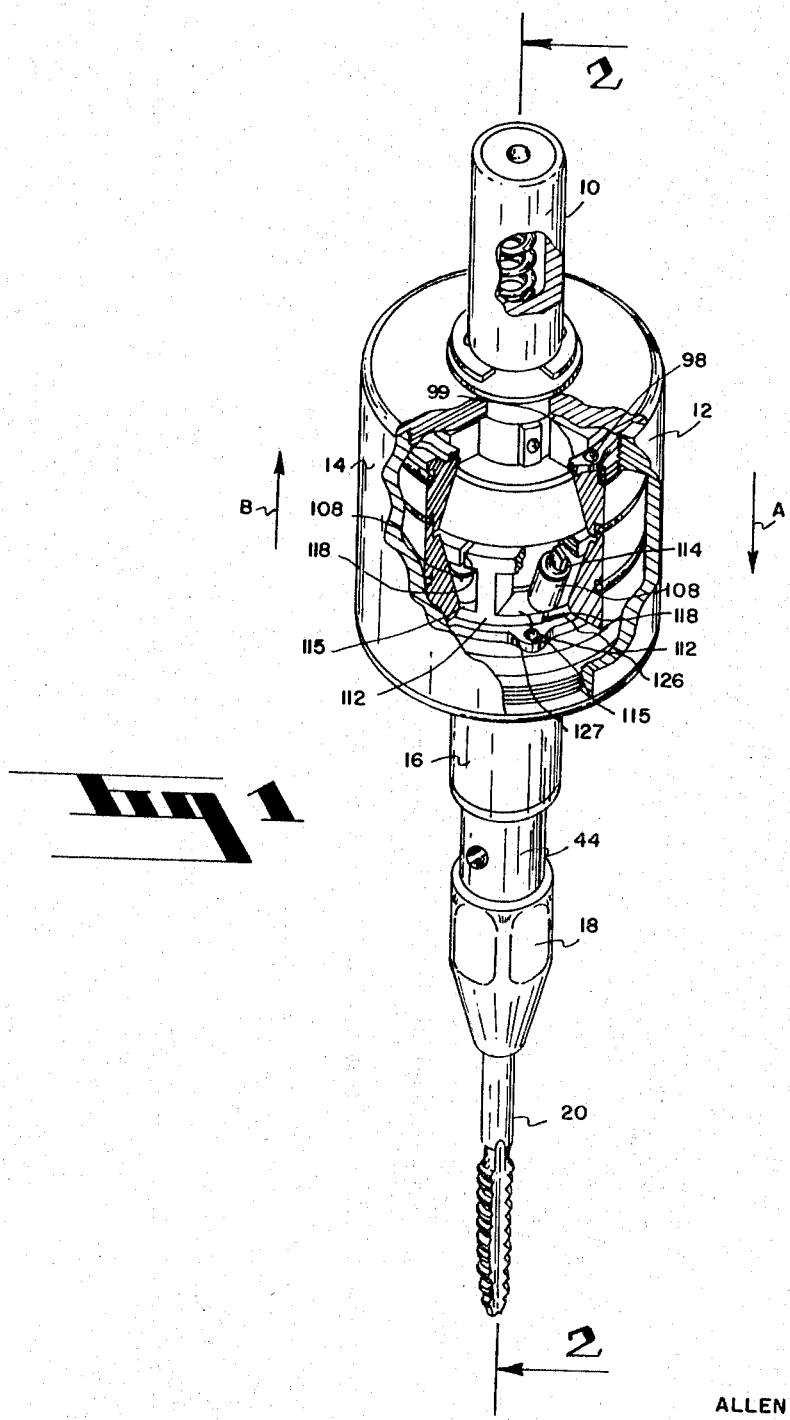
FIG. 1 is a perspective view of a tapping device of the present invention showing portions thereof broken away and in section to amplify the illustration.

As shown in FIGS. 1 and 2 of the drawings, the tapping device of the invention is provided with a power input shaft 10 which is adapted to be held in the chuck of a drill press or in any other suitable holder of a machine tool so that the shaft 10 may be driven and may constitute a power input shaft to the tapping device of the invention.

A housing 12 of substantially larger diameter than the shaft 10 is provided with an externally knurled or friction surface 14 adapted to be grasped by fingers of an operator for manually actuating the tapping device, as will be hereinafter described. The housing 12 encloses operating mechanism of the tapping device of the invention, as will be hereinafter described, while a power output shaft 16 of the invention carries a tap collet or chuck 18 in which a tap 20 is held. The tapping device of the invention is operated when the shaft 10 is power driven and held in stationary position in the chuck of the machine tool, the external surface 14 of the housing 12 is manually engaged and due to a telescopic extendable relationship of the shafts 10 and 16, the housing 12 may be projected downwardly to carry the tap 20 in a direction to enter a hole and to internally tap or thread the hole. When the housing 12 is projected manually in a direction of an arrow A, the tapping device of the invention rotates the tap 20 in a clockwise direction to tap a hole and permits the operator to hold the housing 12 stationary while the tap enters the hole and taps it. When the housing 12 is retracted manually, as indicated by an arrow B in FIG. 1 of the drawings, reversing mechanism inside the housing 12, as will be hereinafter described, reverses rotation of the tap 20 causing it helically to move out of the tapped hole.

Referring particularly to FIG. 2 of the drawings, it will be seen that the shaft 10 is provided with an external surface 21 engageable by jaws of a chuck or other holder of a power tool. The shaft 10 is hollow and, thus, provided with an internal bore 22 housing a tension spring 24 having a hook end 26 engaged around a cross pin 28 which has its opposite ends disposed in holes 30 and 32 diametrically opposed to each other and disposed in an annular side wall of a cup-shaped cap 34 which is rotatably mounted in an enlarged bore 36 concentric with the bore 22. A transition between the large bore 36 and the first mentioned bore 22 provides a bearing race ledge 38 upon which a row of thrust bearings 40 are disposed. These thrust bearings 40 are engaged in an annular conforming race portion 42 at a normally lower end of the cup-shaped cap 34. The cap 34, thus, encloses the normally upper open end of the shaft 10 and is rotatable therein to permit rotating freedom of the spring 26 by means of the balls 40 so that relative rotation of the shafts 10 and 16, as will be hereinafter described, may not impose undue torsional stress on the spring 24.

A normally lower end of the spring 24 is connected to a pin 46 carried in a stub 44 fixed internally of a bore portion 48 of the hollow shaft 16. The shaft 10 is reciprocally and rotatably mounted in a bore 50 of the shaft 16 and a lower end 52 of the shaft 10 is adjacent to and may abut with an upper end 54 of the stub 44 which is fixed internally of the bore 48 of the shaft 16. It will be seen that the thrust bearings permit rotational freedom of the spring 24 relative to the shaft 10 and that the spring being a tension spring tends to hold the shaft 16 in retracted position relative to the shaft 10. However, the shaft 16 may be projected axially in a direction away from the thrust bearings 40 and with relation to the shaft 10, as will be hereinafter described.

The housing 12 is provided with a generally hollow cylindrical housing portion 56 of annular cross section and this housing portion 56 is held concentrically relative to the shafts 10 and 16 by means of an end plate portion 58 of the housing which is connected to the housing portion 56 by screw threads 60. The end plate 58 is provided with a central bushing 62 having a bore 64 which is slidably and rotatably mounted on the exterior annular surface 66 of the shaft 10. A lower annular plate 68 is connected by screw threads 70 to the housing portion 56 and this end plate 68 is provided with a clearance hole 72, which surrounds the periphery of the shaft 16, all as shown best in FIG. 2 of the drawings.

Disposed internally of the housing 12 and directly below the plate 58 is a first cone clutch member 74, which is provided with an internal frusto conical clutch surface 76 adapted to bear on a facing 78 of a complemental cone clutch member 80.

The cone clutch member 74 is provided with a circulating ball key structure 82, fixed thereto by means of a screw 84, whereby the circulating ball key structure 82 is disposed in an axially disposed slot 86 in the outer side wall of the shaft 10. The key structure 82 is provided with a block 88, which is held in the slot 86 by the screw 84, which is screw threaded in the block 88. This block 88 is provided with a ball bearing race 90, generally of the shape as shown in the FIG. 5 of the drawings, such that peripheries of balls 92 may engage one of the opposite inner side walls 94 and 96 of the keyway slot 86. It will be seen that when torque is transmitted from the shaft 10 to the clutch member 74 and that when this clutch member 74 is moved axially or longitudinally of the shaft as will be hereinafter described that the ball bearings 92 will generally bear on the one side 96 and will be free of the remaining side, so that the balls 92 will circulate continuously in the endless race 90, and thereby provide a minimum friction key to permit slidable movement of the cone clutch member 74 longitudinally of the shaft 10, when at the same time torque is being transmitted from the shaft 10 to the cone clutch member 74.

The cone clutch member 74 is thus mounted on the shaft 10 to slide axially thereof and to be driven by the shaft 10.

An annular row of thrust bearings 98 are held in a retainer 99 and are disposed between the end plate 58 and the cone clutch member 74, in order to transmit axial thrust from the housing 12 to the cone clutch member 74 when manual engagement with the outer surface 14 of the housing 12 causes application of force in the direction of the arrow A, as hereinbefore described. Thus, the thrust bearings 98 minimize friction between the housing and the cone clutch member 74, as it is rotatably driven by the shaft 10 and when the housing 12 is manually held stationary against rotation and when it is also projected axially in the direction of the arrow A, as shown in FIGS. 1 and 2 of the drawings.

The cone clutch member 80 is provided with an annular frusto conical facing 100, which is engageable by the cone clutch surface 76 of the cone clutch member 74. The cone clutch member 80 is provided with a bore 104, which is fixed on the periphery of the hollow shaft 16, all as shown best in FIG. 2 of the drawings. This cone clutch member 80 is also provided with a peripheral roller engaging surface 106 disposed at an acute angle to the axes of the shafts 10 and 16. This surface 106 is engaged by a plurality of tapered rollers 108, which are rotatably mounted on shafts 110 and these shafts 110 are supported in a roller carrier 112. The roller carrier 112 is provided with openings 114, wherein the rollers 108 are held by the shafts 110. Upper and lower ends 114 and 116 of the shafts 110 are provided with flat portions as shown best in FIG. 1 of the drawings and these flat portions are retained in slots 118 above and below the openings 115 in the roller carrier 112. This roller carrier 112 is secured by screws 120 to the end plate 68 and thus held in fixed relation with the housing 56.

Disposed outwardly of the row of rollers 108 and the carrier 112 and surrounding the row of rollers is a roller race member 122, having an inner annular surface 124 engaging the rollers 108. This annular surface 124 converges downwardly toward the housing end plate 68, and the annular roller engaging surface 106 also converges downwardly toward the end plate 68, and the included angle between these annular surfaces 106 and 124 is such as to provide for a taper locking relation with the surfaces and the rollers, so that a positive rotary coupling is obtained. The included angle between the converging surfaces 106 and 124 is less than 7° and may preferably be more nearly 3° to provide a more sensitive and easily locked rotary drive reversing mechanism as will be hereinafter described.

It will be seen that both of the annular roller engaging races or surfaces 106 and 124, converge toward each other in a direction of the end plate 68, and in a direction longitudinally of the shafts 10 and 16.

An annular row of thrust bearings 126 is carried by a retainer 127 disposed to engage a lower annular surface 128 of the roller engaging race 122, and this annular row of thrust bearings 126 is supported on a bearing surface 130 of an annular radially extending flange 132 of the roller carrier 112. Thus, upward manual force applied to the housing 12 tends to force the thrust bearings 126 to bear against the lower annular surface 128 of the roller race 122 and to cause the surface 124 to be forced into a locking taper engagement with the axially converging surfaces of the rollers 108, which are restrained from being moved axially within the roller carrier 112, inasmuch as upper and lower ends of these rollers 108 are retained within upper and lower limits of the openings 105 in the roller carrier 112, all as will be hereinafter described in detail.

The roller race member 122 is provided with a peripherally disposed annular groove 134, in which a spring portion 136 of a retainer spring 138 is disposed. The general shape of the retainer spring 138 is shown on FIG. 7 of the drawings, and is shown in section in FIG. 8 of the drawings. Also this retainer spring 138 is shown in assembly in FIG. 2 of the drawings.

An intermediate portion 140 of the retainer spring 138 interconnects and is integral with the portion 136 and another like arcuate portion 142. This arcuate portion 142 is disposed in an annular groove 144 in the cone clutch member 74, all as shown best in FIG. 2 of the drawings.

The portion 140 of the retainer spring 138 extends longitudinally of the axis of the tapping device of the invention in a slot 146, which extends through the cone clutch member 74 and the race member 122, all as shown best in FIG. 8 of the drawings. Thus, the retainer spring 138 holds the roller race 122 and the cone clutch member 74 in connected relationship with each other, and a spacer ring 148 is disposed between the cone clutch member 74 and the roller race 122 to provide for a reciprocal operation of the cone clutch 74 in its engagement with the cone clutch 80 and the engagement of the rollers 108 in locking rotary operation with the race member 122 and the annular surface 106. It will be seen that the intermediate portion 140 of the retainer spring 138 locks the cone clutch member 74, and the roller race 122 against relative rotation so that these two members must always rotate together.

The spacer 148 is such that when the cone clutch 74 is pressed downwardly into engagement with the cone clutch member 80 the spacer 148 causes the roller race 122 to be forced downwardly to release it from the rollers 108 and thereby release them from driving relation with the surface 106. Conversely, when the housing 12 is forced upwardly relative to the shaft 16, carrying an engaged tap, the thrust bearings 126 force the roller race 122 at its surface 124 into locking relation with the rollers 108 as they bear against the annular surface 106 of the cone clutch member 80, which is fixed to the shaft 16. At this time the spacer 148 moves upward and forces the cone clutch member 74 to release from the cone clutch facing 100 of the cone clutch 80. Thus, the spacer 148 plays an important part of either releasing the cone clutches or releasing the tapered reversing rollers 108, depending upon the operational direction in which the housing 12 is manually forced, all as will be hereinafter described in detail.

The stub shaft 44 fixed to the tap supporting shaft 16, carries a chuck or collet 18 hereinbefore described.

In operation, the tapping device of the invention performs substantially as follows: When an upper portion of the shaft 10 is fixed in a drill press chuck, for example, and when it is desired to force the tap 12 into a hole and to cut threads therein, the shaft 10 is power driven by rotation of the chuck of the drill press and the external surface 14 of the housing 12 is grasped between the fingers of the operator and forced downwardly. At this time the thrust bearings 98 apply pressure to the cone clutch 74, which is then forced into engagement with the cone clutch 80 fixed to the shaft 16 and when the cone clutch elements 74 and 80 lock up they positively drive the shaft 44 and collet 18 together with the tap 12.

As the housing 12 is forced in the direction of the arrow A, as shown in FIGS. 1 and 2 of the drawings, the spring 24 tends to resist telescopic extension of the shaft 16, relative to the shaft 10, however, this resistance of the spring 24 causes an applied load between the cone clutches 74 and 80, and as this happens the clutches lock up and rotate the chuck 18 and tap 20. As the housing 12 is forced further in the directions of the arrow A, the tap 20 may be forced into a hole and caused to cut threads therein.

As the tap pogresses into the hole, its torque reaction is transmitted to the cone clutches and may require additional axial pressure of the operator in the direction of the arrow A to drive the tap. Accordingly, this serves as an indication of torque reaction to the operator, so that the axial thrust of the operator on the housing 12 in the direction of the arrow A, must be within a certain proportion, related to the actual torque required to run the tap into the material and cut threads therein.

When the housing 12 is forced in the direction of the arrow A and the thrust bearings 98 force the cone clutch 74 to engage the clutch 80, the spacer 148 disengages the roller race 122 from the rollers 108, and thus permits the shaft 10 directly to drive the shaft 16. However, during movement of the housing 12 axially relative to the shaft 10 and during telescopic extension of the shaft 16 relative to the shaft 10, the block 82 of the ball bearing key structure moves longitudinally of the slot 86 and couples the cone clutch member 74 in driving relation with the shaft 10. As hereinbefore described, the balls 92 in the block 82 progressively circulate through the race 90, as shown in FIG. 5, while the ball bearing key assembly moves longitudinally of the slot 86.

When it is desired to reverse the tap 20 and helically back it out of the tapped hole, the operator must apply force on the housing 12 in a direction of the arrow B which thereby causes the lower end plate 68 to engage and force the thrust bearings 126 upwardly and to thereby force the roller race 122 upwardly, whereby the race surface 124 engages the periphery of the rollers and causes them to be engaged in a locking taper relationship between the surfaces 106 and 124, all the while the rollers are free to rotate on the shafts 110. Inasmuch as the roller race 122 is coupled to the cone clutch member 74 by the retainer spring 138 and since the cone clutch 74 is coupled to the shaft 10 by the ball bearing key assembly 82, the shaft 10 drives the cone clutch 74 and it through the intermediate portion 140 of the retainer spring 138 drives the race 122, the race 122 drives the rollers 108 and the rollers drive against the surface 106 of the cone clutch member 80 thereby rotating it in a direction opposite to the rotation of the shaft 10 and the cone clutch 74. This causes the shaft 16 and tap 20 to be driven in a reverse direction and to back it helically out of the tapped hole.

It will be appreciated that the cone clutch 74 may slip relative to the cone clutch 80 when a tap of a bottom tap configuration is in the position of the tap 20 and when the bottom tap is projected to the bottom of the hole being tapped. Further, it will be apparent to those skilled in the art that when the housing 12 is moved in a downward direction of the arrow A, the tap 12 must re-enter a previously tapped hole and since the very limited leverage of manual pressure on the housing 12 does not force the tape, it may seek the original helical path wherein the cutting threads of the tap conformingly follow the previously cut threads in the work piece. In this manner, extremely hard materials may be tapped, undersize initially, and then may be finish tapped by reinserting the tap in the rough tapped hole to attain very smooth and properly finished threads in very tough, hard pieces of material.

It will be obvious to those skilled in the art that various modifications of the present invention may be resorted to in a manner limited only by a just interpretation of the following claims.

I claim:

1. In a tapping device the combination of: a power input shaft adapted to be supported and rotated by a power tool; a tap supporting shaft connected with said power input shaft and telescopically and slidably extendably and rotatably mounted relative thereto; resilient means tending telescopically to retract said tap supporting shaft relative to said power input shaft; first and second clutch members engageable with each other and concentrically mounted on said power input shaft and said tap supporting shaft, respectively; key means axially slidably coupling said power input shaft and said first clutch member positively to rotatably drive said first friction clutch member by said power input shaft; said second clutch member drivingly coupled to said tap supporting shaft; a cylindrical housing surrounding said clutch members and concentrically rotatably mounted relative to said power input shaft and said tap supporting shaft; an engageable portion of said housing for restraining it against rotation; first axial thrust bearing means engageable between said housing and said first clutch member, said first axial thrust bearing means disposed and adapted to force said first clutch member in one direction longitudinally of the axes of said shafts and into engagement with said second clutch member in response to manual force applied to said housing in said one direction and during rotation of said power input shaft and during restraint of said housing against rotation; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races, respectively; said roller engaging surfaces radially spaced apart to form a roller receiving annulus therebetween, said roller engaging surfaces converging toward each other longitudinally of the axis of said shafts; an annular roller cage disposed to support rollers between said roller engaging surfaces of said first and second races; a plurality of tapered rollers conformingly disposed between said roller engaging surfaces and carried by said cage; said roller cage coupled to said housing and restrained against rotation relative thereto; and second axial thrust bearing means engageable between said housing and said first roller race, said second axial thrust bearing means disposed and adapted to force said first roller race in a direction of said roller engaging surfaces to cause rotary locking of said rollers and said second and first roller races to thereby drive said tap supporting shaft in a direction opposite to that of said power input shaft in response to manual force applied to said housing in a direction opposite to said one direction while said housing is restrained from torque reaction rotation.

2. In a tapping device the combination of: a power input shaft adapted to be supported and rotatably driven by a power tool; a tap supporting and driving shaft connected with said power input shaft and telescopically and slidably extendably and rotatably mounted relative thereto; tap holding means carried by said tap supporting shaft; resilient means tending telescopically to retract said tap supporting shaft relative to said power input shaft; first and second friction clutch members engageable with each other and concentrically disposed relative to said power input shaft and said tap supporting shaft; key means axially movably coupling said power input shaft and said first friction clutch member positively to rotatably drive said first friction clutch member by said power input shaft; said second clutch member coupled to and disposed to rotatably drive said tap supporting shaft; a cylindrical housing surrounding said clutch members and concentrically rotatably mounted relative to said power input shaft and said tap supporting shaft; an engageable portion of said housing adapted to be engaged to restrain said housing against rotation; first axial thrust bearing means engageable between said housing and said first clutch member, said first axial thrust bearing means disposed and adapted to force said first clutch member in one direction longitudinally of the axes of said shafts and into frictional engagement with said second clutch member in response to force applied to said engageable portion of said housing in said one direction and during rotation of said power input shaft and during restraint of said housing against rotation, said housing when forced in said one direction to engage said clutch members also causing telescopic extension of said tap supporting shaft relative to said power input shaft; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races, respectively; said roller engaging surfaces radially spaced apart to form a roller receiving annulus therebetween, said roller engaging surfaces converging toward each other longitudinally of the axis of said shafts, the included angle of convergence of said races relative to each other being less than seven degrees; an annular roller cage disposed to support rollers between said roller engaging surfaces of said first and second races; rollers rotatably mounted in said cage and held captive therein against movement laterally of their rotary axes on an arcuate path about the axes of said shafts; a plurality of tapered rollers conformingly disposed between said roller engaging surfaces and carried by said cage; said roller cage coupled to said housing and restrained against rotation about axes of said shafts and relative to said housing; and second axial thrust bearing means engageable between said housing and said first roller race; said second axial thrust bearing means disposed and adapted to force first said roller race in a direction of said roller engaging surfaces to cause rotary taper locking of said rollers and said roller races to thereby drive said second roller race and said tap supporting shaft in a direction opposite to that of said power input shaft in response to manual force applied to said housing in a direction opposite to said one direction while said housing, said rollers and said roller cage are restrained from torque reaction movement about the axes of said shafts.

3. In a tapping device the combination of: a power input shaft adapted to be supported and rotated by a power tool; a tap supporting and driving shaft connected with said power input shaft and telescopically and slidably extendably and rotatably mounted relative thereto; tap holding means carried by said tap supporting shaft; resilient means tending telescopically to retract said tap supporting shaft relative to said power input shaft; first and second friction clutch members engageable with each other and concentrically disposed relative to said power input shaft and said tap supporting shaft; key means axially movably coupling said power input shaft and said first friction clutch member positively to rotatably drive said first friction clutch member by said power input shaft; said second clutch member coupled to and disposed to rotatably drive said tap supporting shaft; a cylindrical housing surrounding said clutch members and concentrically rotatably mounted relative to said power input shaft and said tap supporting shaft; a manually engageable portion of said housing adapted to be engaged to restrain said housing against rotation; first axial thrust bearing means engageable between said housing and said first clutch member, said first axial thrust bearing member disposed and adapted to force said first clutch member in one direction longitudinally of the axes of said shafts and into frictional engagement with said second clutch member in response to manual force applied to said engageable portion of said housing in said one direction and during rotation of said power input shaft, said housing when forced in said one direction to engage said clutch members also causing telescopic extension of said tap supporting shaft relative to said power input shaft; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races, respectively, said roller engaging surfaces radially spaced apart to form a roller receiving annulus therebetween, said roller engaging surfaces converging toward each other longitudinally of the axes of said shafts; the included angle of convergence of said races relative to each other being less than seven degrees to provide for taper locking of said rollers between said surfaces; an annular roller cage disposed to support rollers between said roller engaging surfaces of said first and second races; rollers rotatably mounted in said cage and held captive therein against movement laterally of their axes in a direction about the axes of said shafts; a plurality of tapered rollers conformingly disposed between said roller engaging surfaces and carried by said cage; said roller cage coupled to said housing and restrained against rotation about axes of said shafts and relative to said housing; and second axial thrust bearing means engagable between said housing and said first roller race, said axial thrust bearing means disposed and adapted to force said first roller race in a direction of said roller engaging surfaces to cause rotary taper locking of said rollers and said roller races to thereby drive said second roller race and said tap supporting shaft in a direction opposite to that of said power input shaft in response to manual force applied to said housing in a direction opposite to said one direction while said housing, said rollers and said roller cage are restrained from torque reaction movement about the axes of said shafts.

4. In a tapping device the combination of: a power input shaft adapted to be supported and rotated by a power tool; a tap supporting and driving shaft connected with said power input shaft and telescopically and slidably extendably and rotatably mounted relative thereto; tap holding means carried by said tap supporting shaft; resilient means tending telescopically to retract said tap supporting shaft relative to said power input shaft; first and second friction clutch members engageable with each other and concentrically disposed relatively to said power input shaft and said tap supporting shaft; key means axially movably coupling said power input shaft and said first friction clutch member positively to rotatably drive said first friction clutch member by said power input shaft; said second clutch member coupled to and disposed to rotatably drive said tap supporting shaft; a cylindrical housing surrounding said clutch members and concentrically rotatably mounted relative to said power input shaft and said tap supporting shaft; a manually engageable portion of said housing adapted to be engaged to restrain said housing against rotation; first axial thrust bearing means engageable between said housing and said first clutch member, said first axial thrust bearing member disposed and adapted to force said first clutch member in one direction longitudinally of the axes of said shafts and into frictional engagement with said second clutch member in response to manual force applied to said engageable portion of said housing in said one direction and during rotation of said power input shaft, said housing when forced in said one direction to engage said clutch members also causing telescopic extension of said tap supporting shaft relative to said power input shaft; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races, respectively, said roller engaging surfaces radially spaced apart to form a roller receiving annulus therebetween, said roller engaging surfaces converging toward each other longitudinally of the axes of said shafts; the included angle of convergence of said races relative to each other being less than seven degrees to provide for taper locking of said rollers between said surfaces; an annular roller cage disposed to support rollers between said roller engaging surfaces of said first and second races; rollers rotatably mounted in said cage and held captive therein against movement laterally of their axes in a direction about the axes of said shafts; a plurality of tapered rollers conformingly disposed between said roller engaging surfaces and carried by said cage; said roller cage coupled to said housing and restrained against rotation about axes of said shafts and relative to said housing; and second axial thrust bearing means engageable between said housing and said first roller race, said second axial thrust bearing means disposed and adapted to force said first roller race in a direction of said roller engaging surfaces to cause rotary taper locking of said rollers and said roller races to thereby drive said second roller race and said tap supporting shaft in a direction opposite to that of said power input shaft in response to manual force applied to said housing in a direction opposite to said one direction while said housing, said rollers and said roller cage are restrained from torque reaction movement about the axes of said shafts; said key means comprising an endless race member; a plurality of ball bearings in said endless race member; said power input shaft having a slot portion longitudinally thereof in which said endless race member is disposed to hold said ball bearings in engagement with one side of said slot; said endless race member fixed to said first friction clutch member.

5. In a tapping device the combination of: a power input shaft adapted to be supported and rotated by a power tool; a tap supporting shaft connected with said power input shaft and telescopically and slidably extendably and rotatably mounted relative thereto; resilient means tending telescopically to retract said tap supporting shaft relative to said power input shaft; first and second clutch members engageable with each other and concentrically mounted on said power input shaft and said tap supporting shaft, respectively; key means axially slidably coupling said power input shaft and said first clutch member positively to rotatably drive said first friction clutch member by said power input shaft; said second clutch member fixed to said tap supporting shaft; a cylindrical housing surrounding said clutch members and concentrically rotatably mounted relative to said power input shaft and said tap supporting shaft; a manually engageable portion of said housing; first axial thrust bearing means engageable between said housing and said first clutch member, said first axial thrust bearing means disposed and adapted to force said first clutch member in one direction longitudinally of the axes of said shafts and into engagement with said second clutch member in response to manual force applied to said housing in said one direction and during rotation of said power input shaft and during manual restraint of said housing against rotation; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races, respectively; said roller engaging surfaces radially spaced apart to form a roller receiving annulus therebetween, said roller engaging surfaces converging toward each other longitudinally of the axis of said shafts; an annular roller cage disposed to support rollers between said roller engaging surfaces of said first and second races; a plurality of tapered rollers conformingly disposed between said roller engaging surfaces and carried by said cage; said roller cage coupled to said housing and restrained against rotation relative thereto; and second axial thrust bearing means engageable between said housing and said first roller race, said second axial thrust bearing means disposed and adapted to force said first roller race in a direction of said roller engaging surfaces to cause rotary locking of said rollers and said roller races to thereby drive said tap supporting shaft in a direction opposite to that of said power input shaft in response to manual force applied to said housing in a direction opposite to said one direction while said housing is restrained from torque reaction rotation; said power input shaft and said tap supporting shaft having bore portions concentric with each other and said resilient means comprising a spring disposed concentrically and internally of said shafts and interconnecting the same and tending to retract said tap supporting shaft relative to said power input shaft.

6. In a tapping device the combination of: a power input shaft adapted to be supported and rotated by a power tool; a tap supporting shaft connected with said power input shaft and telescopically and slidably extendably and rotatably mounted relative thereto; resilient means tending telescopically to retract said tap supporting shaft relative to said power input shaft; first and second friction cone clutch members engageable with each other and concentrically mounted on said power input shaft and said tap supporting shaft, respectively; key means axially slidably coupling said power input shaft and said first friction clutch member positively to rotatably drive said first friction member by said power input shaft; said second clutch member fixed to said tap supporting shaft; a cylindrical housing surrounding said clutch members and concentrically rotatably mounted relative to said power input shaft and said tap supporting shaft; a manually engageable portion of said housing; first axial thrust antifriction bearing means engageable between said housing and said first clutch member, said first axial thrust bearing means disposed and adapted to force first clutch member in one direction longitudinally of the axes of said first shafts and into frictionally engagement with said second clutch member in response to manual force applied to said housing in said one direction and during rotation of said power input shaft and during manual restraint of said housing against rotation; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races, respectively; said roller engaging surfaces radially spaced apart to form a roller receiving annulus therebetween, said roller engaging surfaces converging toward each other longitudinally of the axis of said shafts and in a direction opposite to said one direction; an annular roller cage disposed to support rollers between said roller engaging surfaces of said first and second races; a plurality of tapered rollers conformingly disposed between said roller engaging surfaces and carried by said cage; said roller cage coupled to said housing and restrained against rotation relative thereto; and second axial thrust antifriction bearing means engageable between said housing and said first roller races, said second axial thrust bearing means disposed and adapted to force said first roller race in a converging direction of said roller engaging surfaces to cause rotary locking of said rollers and said roller races to thereby drive said tap supporting shaft in a direction opposite to that of said power input shaft in response to manual force applied to said housing in a direction opposite to said one direction while said housing is restrained from torque reaction rotation.

7. In a tapping device the combination of: a power input shaft adapted to be supported and rotated by a power tool; a tap supporting shaft connected with said power input shaft and telescopically and slidably extendably and rotatably mounted relative thereto; resilient means tending telescopically to retract said tap supporting shaft relative to said power input shaft; first and second clutch members engageable with each other and concentrically mounted on said power input shaft and said tap supporting shaft, respectively; key means axially slidably coupling said power input shaft and said first clutch member positively to rotatably drive said first friction clutch member by said power input shaft; said second clutch member fixed to said tap supporting shaft; a cylindrical housing surrounding said clutch members and concentrically rotatably mounted relative to said power input shaft and said tap supporting shaft; a manually engageable portion of said housing; first axial thrust bearing means engageable between said housing and said first clutch member, said first axial thrust bearing means disposed and adapted to force said first clutch member in one direction longitudinally of the axes of said shafts and into engagement with said second clutch member in response to manual force applied to said housing in said one direction and during rotation of said power input shaft and during manual restraint of said housing against rotation; first and second roller races disposed concentrically relative to said shafts; said first roller race coupled in rotary driving relation to said power input shaft; said second roller race coupled in rotary driving relation to said tap supporting shaft; first and second annular roller engaging surfaces of said first and second roller races; respectively; said roller engaging surfaces radially spaced apart to form a roller receiving annulus therebetween, said roller engaging surfaces converging toward each other longitudinally of the axis of said shafts;

an annular roller cage disposed to support rollers between said roller engaging surfaces of said first and second races; a plurality of tapered rollers conformingly disposed between said roller engaging surfaces and carried by said cage; said roller cage coupled to said housing and restrained against rotataion relative thereto; and second axial thrust bearing means engageable between said housing and said first roller race, said second axial thrust bearing means disposed and adapted to force said first roller race in a direction of said roller engaging surfaces to cause rotary locking of said rollers and said roller races to thereby drive said tap supporting shaft in a direction opposite to that of said power input shaft in response to manual force applied to said housing in a direction opposite to said one direction while said housing is restrained from torque reaction rotation; said power input shaft and said tap supporting shaft having bore portions concentric with each other and said resilient means comprising a spring disposed concentrically and internally of said shafts and interconnecting the same and tending to retract said tap supporting shaft relative to said power input shaft; a rotary bearing supporting one end of said spring relative to one of said shafts.

References Cited
UNITED STATES PATENTS

| | | | |
|---|---|---|---|
| 1,359,422 | 11/1920 | Percin | 10—136 |
| 2,538,548 | 1/1951 | Zimmerman | 10—136.1 |

FRANCIS S. HUSAR, *Primary Examiner.*